United States Patent
Lindsey, Jr. et al.

(10) Patent No.: US 7,676,750 B2
(45) Date of Patent: Mar. 9, 2010

(54) METHOD OF PRINTING, SCANNING, AND FAXING USING DEVICE LOCATION

(75) Inventors: David Zachery Lindsey, Jr., Paris, KY (US); Samuel Leo Rhodus, Danville, KY (US); Kenneth Ross Wilkerson, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 425 days.

(21) Appl. No.: 11/700,394

(22) Filed: Jan. 31, 2007

(65) Prior Publication Data

US 2008/0184162 A1    Jul. 31, 2008

(51) Int. Cl.
*G06F 15/00* (2006.01)
*G06F 16/00* (2006.01)

(52) U.S. Cl. ...................... 715/743; 715/740
(58) Field of Classification Search ............... 715/700, 715/740, 743, 853, 855, 840, 763; 358/1.13, 358/1.15; 359/1.13, 1.1
See application file for complete search history.

(56) References Cited

U.S. PATENT DOCUMENTS

2004/0190042 A1* 9/2004 Ferlitsch et al. ............ 358/1.15
2007/0168514 A1* 7/2007 Cocotis et al. ............... 709/225

\* cited by examiner

*Primary Examiner*—Cao "Kevin" Nguyen

(57) ABSTRACT

A method of printing includes providing a computer server linked to a plurality of printers, initiating a print job on a user computer device, querying the computer server for one or more available printers; transmitting identification information and location information of each printer from the computer server to the user computer device; displaying the information in the form of a list to the user computer device; selecting by a user one of the printers in the list; transmitting the selection to the computer server; transmitting configuration information for the selected printer to the user computer device; configuring the print data by with the configuration information; and transmitting the configured print data from the user computer device to the selected printer for printing.

15 Claims, 7 Drawing Sheets

METHOD OF PRINTING, SCANNING, AND FAXING USING DEVICE LOCATION

FIELD OF THE INVENTION

The present invention relates to a method of printing, scanning and faxing from a user computer device. Specifically, the present invention involves simplifying the process of finding and using network connected devices in close proximity on a wired or wireless network.

BACKGROUND OF THE INVENTION

The setting of the invention is a network (wired, wireless, or both) of devices such as printers, scanners, multifunction printing devices, personal computers, and handheld user computer devices. Mobile users connected to a network need the ability to easily and quickly discover and use the services provided by the devices on the network. These may include printing, scanning, and faxing. In particular, the mobile user needs a way of determining which devices offering the desired services are in close proximity of the user.

Printing methods currently on the market require a user to install a printer driver or other printer software on an user computer device before any file can be printed on that specific printer. Because of the hundreds of printer models currently on the market, it is improbable that a user would have printer drivers or software for each of these printers. Typically, a user only has the printer software of his home printer or printers installed on his user computer device. For a mobile user, this causes problems when printing needs arise while away from the user's home printer or printers. The present invention is designed to overcome the shortcomings in current market products by simplifying the process.

SUMMARY OF THE INVENTION

The present invention solves the above problem by providing a method of printing, scanning, or faxing based on the location of the device.

It is a first aspect of the present invention to provide a computer implemented method of printing, including the steps of: (a) providing a computer server linked via one or more data links to a plurality of printers, where the computer server has access to identification information, location information and configuration information pertaining to each of the plurality of printers, where the configuration information includes information to ensure each of the plurality of printers is configured to correctly print a print job; (b) initiating a print job on a user computer device, where the print job includes print data; (c) querying the computer server by the user computer device for one or more available printers; (d) transmitting identification information and location information of each of the plurality of printers by the computer server to the user computer device; (e) displaying identification information and location information in a list of the plurality of available printers on a user interface operating on the user computer device; (f) selecting by a user one of the plurality of available printers in the list; (g) transmitting the selection to the computer server; (h) transmitting configuration information for the selected printer by the computer server to the user computer device; (i) configuring the print data by the user computer device with the configuration information; and (j) transmitting the configured print data from the user computer device to the selected printer for printing on the selected printer. The step of (h) transmitting configuration information for the selected printer by the computer server to the user computer device may occur at any point after the step of (c) querying the computer server by the user computer device for one or more available printers.

In a more detailed embodiment of the first aspect, the method further includes a step of displaying a map on the user interface operating on the user computer device, where the map includes location information of the selected printer. The location information includes relative distance, absolute distance, approximate distance, room number, GPS coordinates, MAC address, IP address, and/or walking directions.

In another detailed embodiment of the first aspect, the method further includes a step of selecting by a user printing capabilities required to correctly print the print job. This additional step may occur prior to displaying identification information and location information in a list of the plurality of available printers on a user interface operating on the user computer device. In this detailed embodiment, the list displaying identification information and location information on a user interface operating on the user computer device includes only printers having user selected printing capabilities, where the user selected printing capabilities may include two-sided printing, multi-page printing, color printing, paper type, and/or print quality or any other printing capability known in the art. Furthermore, the list displaying identification information and location information on a user interface operating on the user computer device may be ordered based on distance between the user computer device and the printer.

In It is a second aspect of the present invention to provide a computer implemented method of printing that includes the steps of: (a) providing a computer server linked via one or more data links to a plurality of printers, where the computer server has access to identification information, location information and configuration information pertaining to each of the plurality of printers, where the configuration information includes information to ensure each of the plurality of printers is configured to correctly print a print job; (b) initiating a print job on a user computer device, where the print job includes print data; (c) querying the computer server by the user computer device for one or more available printers; (d) transmitting identification information and location information of each of the plurality of printers by the computer server to the user computer device; (e) displaying identification information and location information in a list of the plurality of available printers on a user interface operating on the user computer device; (f) transmitting a print job notification to the plurality of printers on the list; (g) initiating by a user the print job on a printer interface of one of the plurality of printers; (h) transmitting configuration information for the selected printer by the computer server to the user computer device; (i) configuring the print data by the user computer device with the configuration information; and (j) transmitting the configured print data from the user computer device to the selected printer for printing on the selected printer. This second aspect of the present invention may additionally include the step of displaying a map on the user interface operating on the user computer device, where the map includes location information of the plurality of available printers. Location information may include relative distance, absolute distance, approximate distance, room number, GPS coordinates, MAC address, IP address, and/or walking directions.

It is a third aspect of the present invention to provide a computer implemented method of scanning that includes the steps of: (a) providing a computer server linked via one or more data links to one or more scanners, where the computer server has access to identification information, location information and configuration information pertaining to each of the one or more scanners, where the configuration information includes information to ensure each of the one or more scanners is configured to correctly communicate a scan job to a user computer device; (b) initiating a scan job on a user computer device; (c) querying the computer server by the user computer device for one or more available scanners; (d) transmitting identification information and location information of each of the one or more scanners by the computer server to the user computer device; (e) displaying identification information and location information in a list of the one or more scanners on a user interface operating on the user computer device; (f) transmitting a scan job notification and a device address to the one or more scanners on the list; and (g) initiating by a user the scan job on a scanner interface of a first one of the one or more scanners. This third aspect may additionally include the step of displaying a map on the user interface operating on the user computer device, where the map includes location information of the available scanners. This additional step occurs prior to initiating by a user the scan job on a scanner interface of one of the plurality of scanners. Location information may include relative distance, absolute distance, approximate distance, room number, GPS coordinates, MAC address, IP address, and/or walking directions.

It is a fourth aspect of the present invention to provide a computer implemented method of faxing that includes the steps of: (a) providing a computer server linked via one or more data links to one or more fax devices, where the computer server has access to identification information, location information and configuration information pertaining to each of the plurality of fax devices, and where the configuration information includes information to ensure each of the one or more fax devices is configured to correctly communicate a fax job to a user computer device; (b) initiating a fax job on a user computer device; (c) querying the computer server by the user computer device for one or more available fax devices; (d) transmitting identification information and location information of each of the one or more fax devices by the computer server to the user computer device; (e) displaying identification information and location information in a list of the one or more available fax devices on a user interface operating on the user computer device; (f) transmitting a fax job notification to the plurality of fax devices on the list; and (g) initiating by a user the fax job on a fax device interface of a first one of the one or more fax devices. This aspect may additionally include the step of displaying a map on the user interface operating on the user computer device, where the map includes location information of the available fax devices. This additional step occurs prior to initiating by a user the fax job on a fax device interface of one of the plurality of fax devices. Location information may include relative distance, absolute distance, approximate distance, room number, GPS coordinates, MAC address, IP address, and/or walking directions.

From the foregoing disclosure and the following detailed description of various preferred embodiments it will be apparent to those skilled in the art that the present invention provides a significant advance in the art of methods of printing from an user computer device. Additional features and advantages of various preferred embodiments will be better understood in view of the detailed description provided below.

BRIEF DESCRIPTION OF THE DRAWINGS

The present invention will be understood and appreciated more fully from the detailed description in conjunction with the following drawings in which.

DETAILED DESCRIPTION OF THE DRAWINGS

It will be apparent to those skilled in the art that many uses and variations are possible for the methods of printing, faxing and scanning disclosed herein. The following detailed discussion of various alternative and preferred embodiments will illustrate the general principles of the invention. Other embodiments will be apparent to those skilled in the art given the benefit of this disclosure.

FIGS. 1 through 7 illustrate various embodiments of the present invention. Some terminology used throughout this specification may need to be defined to understand the present invention more thoroughly. As used throughout this specification, the term "user computer device" shall include any computer device capable of generating and/or transmitting a print job (or receiving a scan or fax), such as, without limitation, a desktop personal computer, a laptop personal computer, and a handheld device such as an ultra mobile personal computer ("UMPC"), a personal digital assistant ("PDA"), a network appliance, a digital storage device, a digital music player, a cellular phone or a cellular smartphone. The term "user" shall mean any person or entity implementing or utilizing the present invention manually or by other means. "Print data" shall mean an electronic form of information representing and/or related to a print job. The terms "transmit" and "transmitting" include electronic data transmissions (either wired or wireless) that may be accomplished by implementing any standard or proprietary electronic communications protocols.

Figure 2:
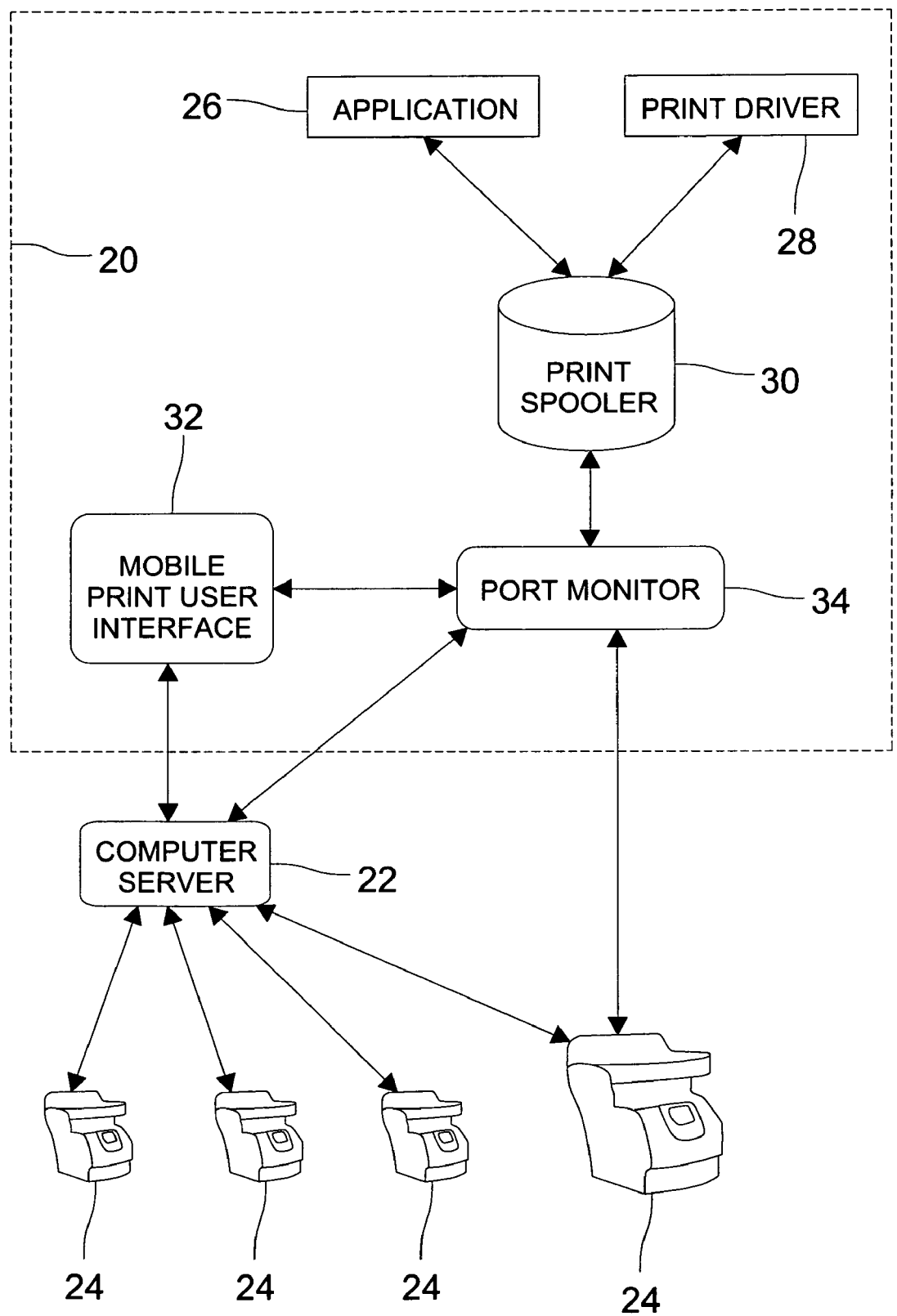
FIG. 2 is a view of exemplary hardware and software components utilized in the present invention.

Referring to FIG. 2, an exemplary system for implementing an embodiment of the present invention is illustrated. In this exemplary system a user computer device 20 is coupled via data links (wired, wireless, and/or networked) to a computer server 22 and a plurality of printing devices 24. Operating on the user computer device 20 is a software tool application 26 (such as Microsoft© Word, Microsoft© Excel, Adobe© Reader or any application that can "print" output) and one or more print drivers 28 that generate print jobs that are placed on a print spooler 30. The user computer device 20 includes a port monitor which includes machine-readable software for establishing communications between devices. These communications are implemented through standard or proprietary electronic communications protocols. Some protocols are designed for discovery of devices, such as printers, scanners, or fax devices, from the user computer device 20. Other protocols may send bi-directional queries. These bi-directional queries may include printer configuration options, printer tray information, finishing options. Additionally, these protocols may send print data to a printing device 24. There are several different protocols used to discover printers 24 and query configuration information, such as what options the printer 24 supports. One is the Network Printer Alliance Protocol (NPAP), which is an industry standard. Simple Network Management Protocol (SNMP) could also be used. SNMP is also an industry standard supported by most network devices, including printers 24. In addition, Microsoft© created a communication protocol referred to as Web Services for Network Connected Devices. A specific section of this protocol is currently referred to as the Print Service Schema and deals specifically with printers 24. A mobile printer user interface software tool 32 is also provided, the function of which is described below.

The computer server 22 in the present embodiment, is a networked server responsible for locating devices, such as printing devices 24, using a communications protocol. It is within the scope of the invention that the computer server 22 may be located on the same user computer device 20 as the port monitor 34 or on a separate network connected device as shown in FIG. 2. In an embodiment where the computer server 22 and the port monitor 34 are located on the same user computer device 20, the computer server 22 may be contained wholly within another component such as the port monitor 34. Location information of a printing device may be determined in many ways. The location of a device such as a printer 24 may be determined by wireless triangulation based on signal strength in relation to multiple wireless access points, GPS, RFID, Wireless USB, grid system, a network database, or any other location technology. Location information may be expressed in relative distance (symbolized by asterisks or graphics), absolute or approximate distance (expressed in feet, yards, or meters), GPS coordinates, room or cubical number, MAC address, device hostname, or IP address. This location information may also be manually input into the respective data locations. Whether or not this location information for the available printers 24 is generated by the computer server 22, such location information is either stored on the computer server 22 or is accessible by the computer server 22.

Figure 1:
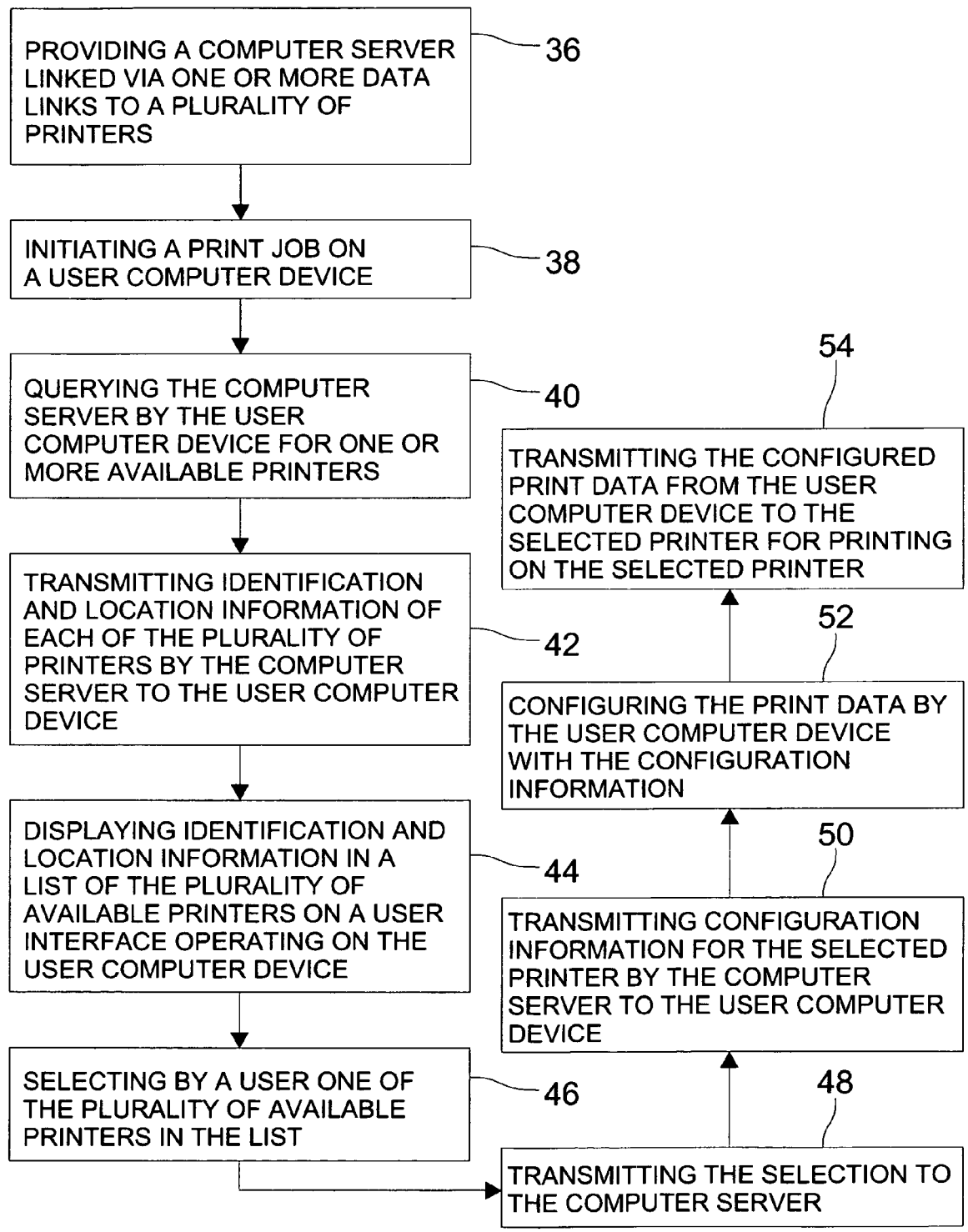
FIG. 1 is a flow diagram of one embodiment of the present invention.

FIG. 1 depicts a flow diagram representing an exemplary process of the present invention. In this embodiment, a computer server 22 linked to a plurality of printers 24 via one or more data links is provided 36. A user may initiate 38 a print job from a user computer device 20 using an application software tool 26, for example, or using any available resource for initiating a print job. This print job includes print data, and is spooled on the print spooler 30 using standard processes known to those skilled in the art. This print data is then transmitted to a port monitor 34. The port monitor 34 then queries 40 the computer server 22 to locate available printing devices 24. At the request of the computer server 22, each of the available printing devices 24 then transmits 42 respective location information and identification information to the computer server 22. A list of available printing devices 24 is then compiled for display 44 on the mobile printer user interface 32 operating on the user computer device 20. A user will then select 46 an available printing device 24 with help from the mobile printer user interface 32 and the selection is transmitted 48 to the computer server 22. Printing configuration information is then transmitted 50 from the computer server 22 to the port monitor 34. The port monitor 34 configures 52 the print data based upon this configuration information and the configured print data is then transmitted 54 from the port monitor 34 to the selected printing device 24. When all or part of the print data is received at the selected printing device 24, the selected printing device 24 will then print the print data onto the desired medium. This medium may include any substrate capable of being printed on such as paper, transparencies, or other medium.

Various methods of transmitting identification, location, and configuration information from a printer 24 to a computer server 22 may be implemented. These methods include wireless triangulation based on signal strength in relation to multiple wireless access points, GPS, RFID, Wireless USB, a grid system, a network database, or any other technology known in the art. Many printers 24 currently available would need no modification to transmit the information as described in the claimed invention. For example, if implementing wireless triangulation to transmit this information, any printer that can determine signal strength from a wireless access point can be used. Printers 24 with this ability require no additional modification or upgrade. However, if using other techniques to transmit this information, additional capabilities may be required to determine the printer's 24 own location information and report that location information to the computer server 22. For example, if implementing GPS technology, a GPS hardware module may be added to the printer 24 to determine the GPS coordinates of the printer 24 or GPS coordinates can be manually inputted by the user.

Alternatively, the step of transmitting 50 configuration information for the selected printer 24 by the computer server 22 to the user computer device 20 may occur at any point after the step of querying 40 the computer server 22 by the user computer device 20 for one or more available printers 24.

In another embodiment, an additional step of displaying a map by the mobile printer user interface 32 may be included. This map may include a relative distance from the user computer device 20 to the selected printing device 24, an approximate distance between the two devices, an absolute distance between the two devices, a room number where the printing device 24 is located, GPS coordinates of the printing device 24, the IP address of the printing device 24, the MAC address of the printing device 24, and/or walking directions to assist a user in finding the printing device 24. Other similar navigational guides or data may also appear on such a map.

Displaying a map on the mobile printer user interface 32 can be accomplished by various methods. This mapping function may use the same techniques as shown above to determine location information. Specifically, wireless triangulation based on signal strength in relation to multiple wireless access points, GPS, RFID, Wireless USB, a grid system, a network database, or any other technology known in the art may be implemented. The map may require input of building maps and coordinates at initial setup of the software. For example, if utilizing wireless triangulation, the printer 24 would transmit its location information to the computer server 22. This location information would then be transmitted to the user computer device 20. To determine location in this example, some component of the entire system must gather the signal strength information from 3 or more access points and calculate the location of the printer 24 based on that information. In one embodiment, this may be done by the computer server 22. Alternatively, the printer 24 itself might have some software running on it that calculates the printer's location and reports it back to the computer server 22 or the user computer device 20. In a similar way, software could be installed on the user computer device 20 to use signal strength to calculate the user computer device's 20 location. In these examples, the map displayed may include a user-submitted building floor plan map with icons and/or text indicating the position of printers based on the received location information.

The list of available printing devices 24 may be limited or filtered by the mobile printer user interface 32 based on user-desired printer configuration options. For example, a user may wish to print to a printing device 24 that has color printing capability. In this instance, the list displayed will only include those available printing devices 24 that have the ability to print in color. If none are available, the list will be empty and the user will be notified that no color printers 24 are available. Alternatively, the list may contain mono printers 24 without color printing capability and a user would be warned that the print job would be printed in mono rather than color. Other such user-desired configuration options may include two-sided printing, multi-page printing, specific paper types and sizes, and specific print quality.

Figure 3:
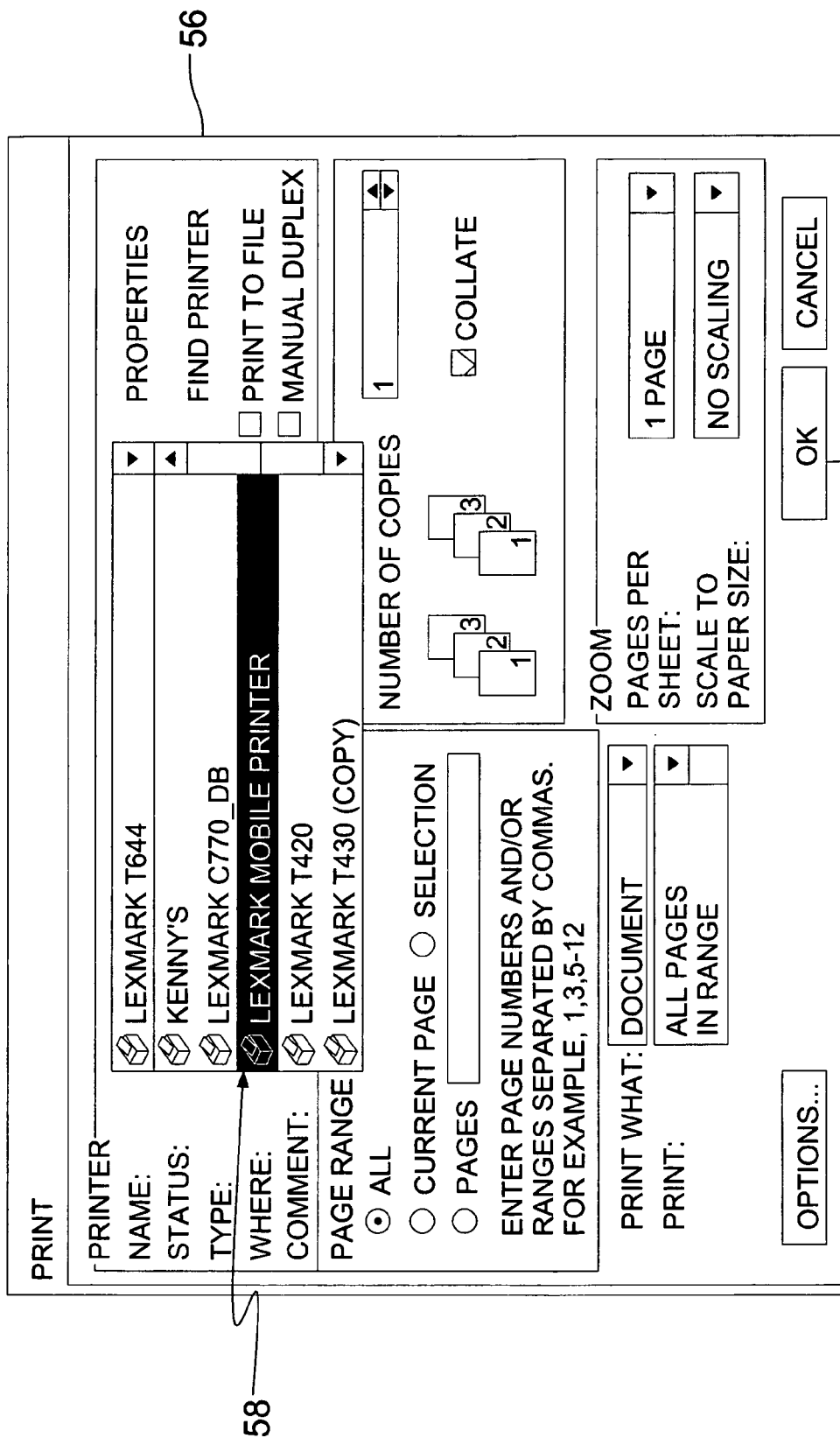
FIG. 3 is an exemplary computer screenshot from one embodiment of the present invention.
Figure 4:
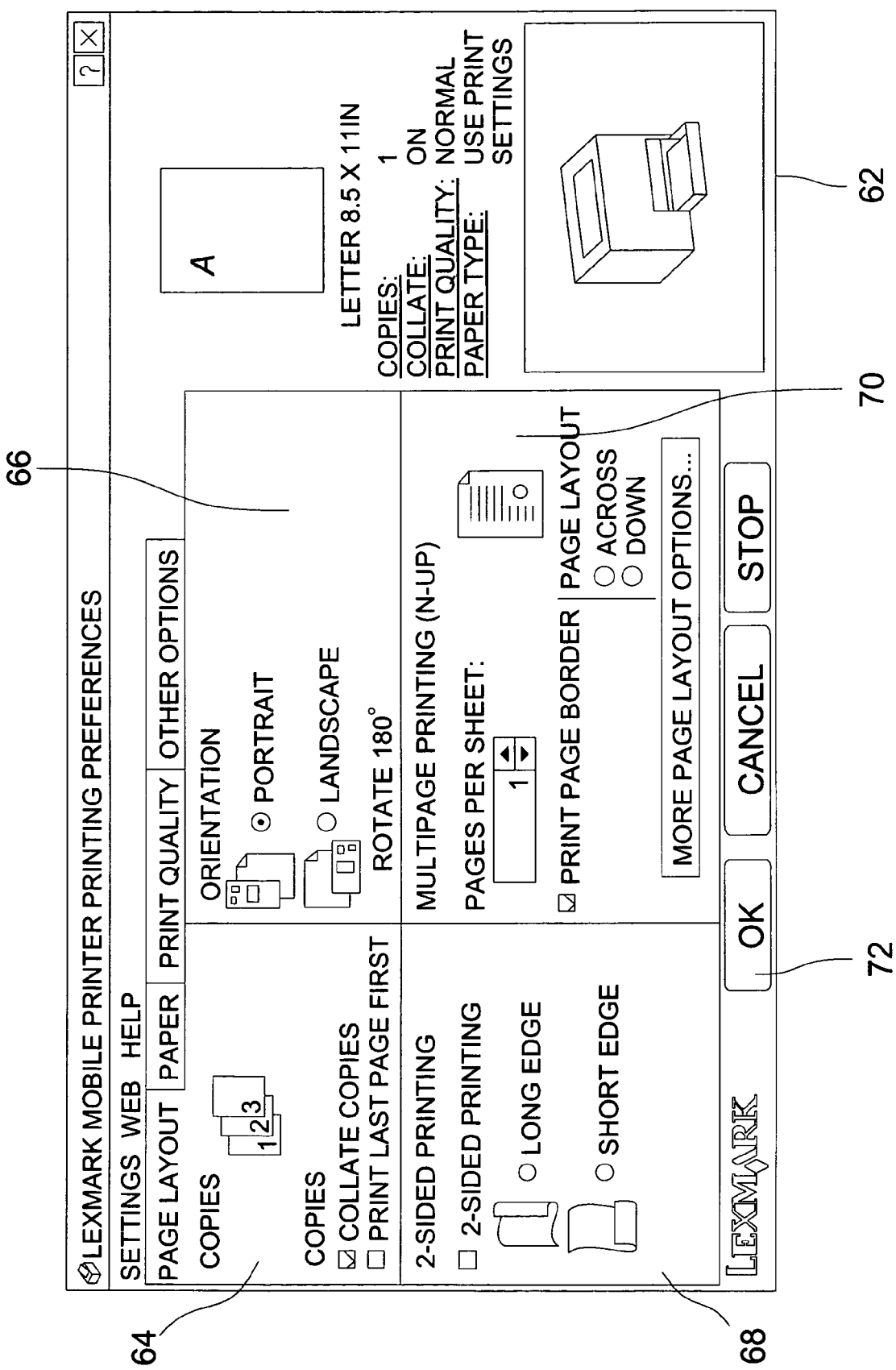
FIG. 4 is an exemplary computer screenshot from one embodiment of the present invention.

FIGS. 3 through 7 depict an exemplary user's experience of one embodiment of the present invention. The computer screenshots from FIGS. 3 through 7 are examples of what a user may see while utilizing the present invention on a user computer device 20. Assume that a user commanded Microsoft© Word, for example, to print a document. FIG. 3 is an example 56 of what the user would see next. To utilize this invention, a user may select a printer 58 (in this example "Lexmark Mobile Printer" "58) that is indicative of the user's desire to implement the process of the present invention and click OK 60 to continue. Next, the Lexmark Mobile Printing Printer Preferences screen 62 will be displayed on the user computer device 20, as seen in FIG. 4. At this point, printing preferences such as number of copies 64, page orientation 66, two-sided printing 68, multi-page printing 70, and other preferences can be selected. After the preferences are selected, the user would then click OK 72 to continue.

Figure 5:
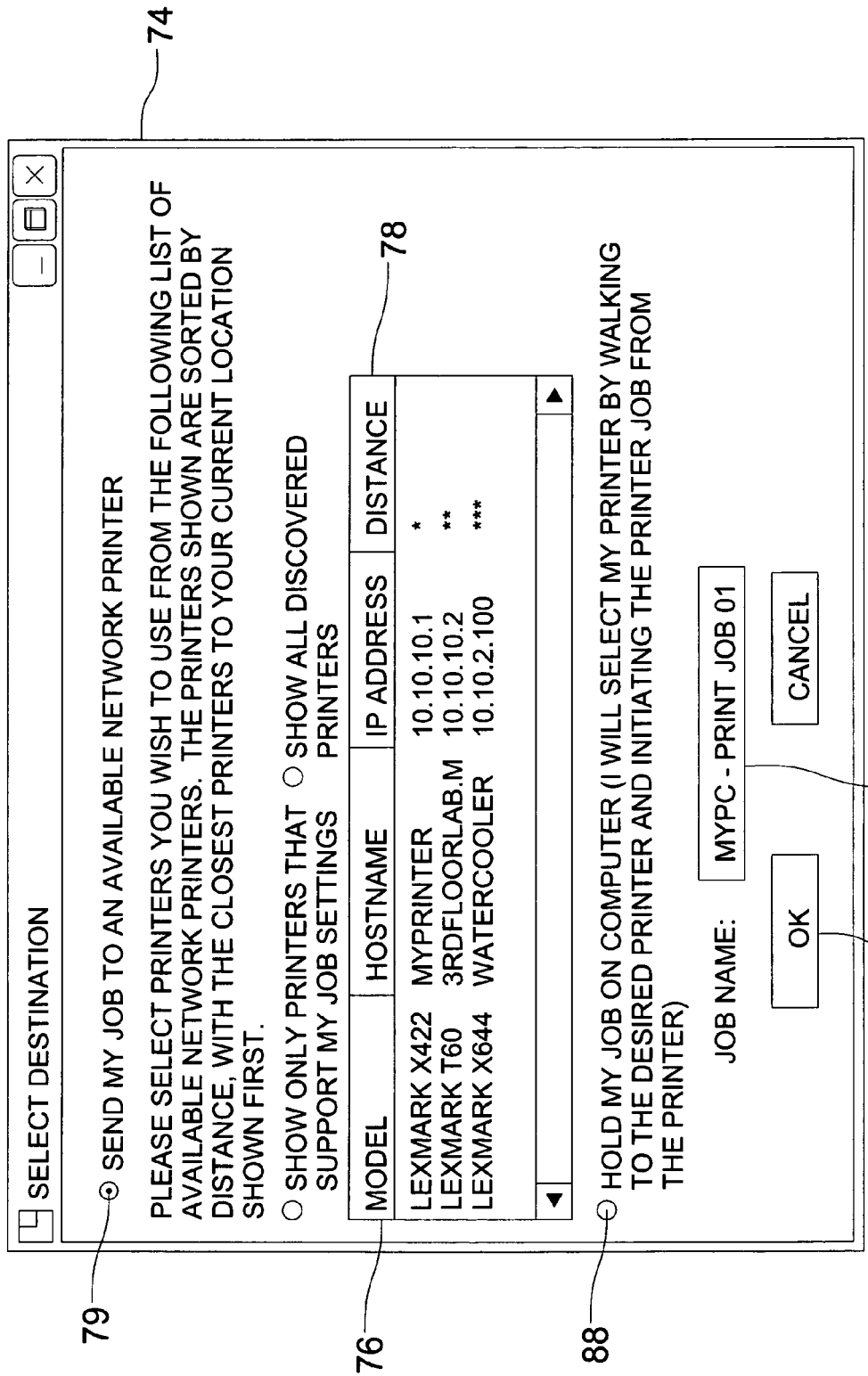
FIG. 5 is an exemplary computer screenshot from one embodiment of the present invention.

The next screen 74 to be displayed by the mobile printer user interface 32 includes a list of available printers 24 that shows printer model 76, printer hostname, IP address, and distance 78. The list in FIG. 5 is sorted by distance 62, from the closest printer 24 (signified by the single asterisk) to the farthest printer 24 (signified by four asterisks). This example also allows the user to view all available printers 24 or just the printers 24 that support the user preferences selected earlier. This list will be utilized if a user selects "Send my job to an available network printer" 79. Clicking OK 80 will initiate the process of exchanging configuration information for the selected printer and the configured print job to the selected printer 24 and allow the user to continue.

Figure 6:
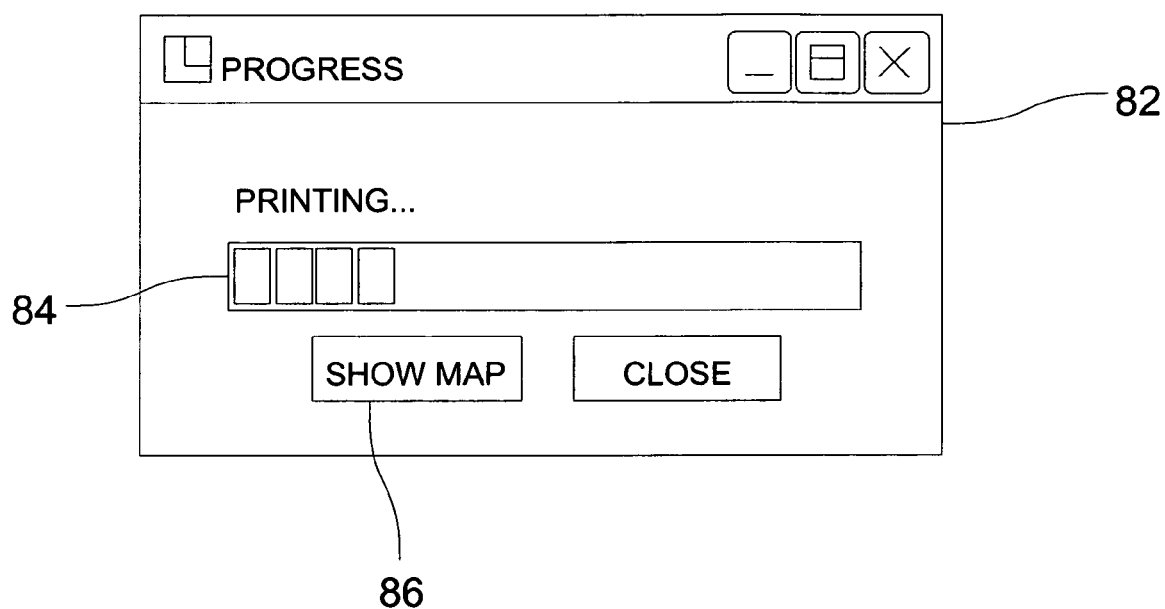
FIG. 6 is an exemplary computer screenshot from one embodiment of the present invention.

FIG. 6 depicts a printing progress screen 82. While the print job is being sent to the selected printer 24, the progress 84 is displayed. Also, the user may click "Show Map" 86 to display a map of the printer location. As described above, the map may include a relative distance from the user computer device 20 to the selected printing device 24, an approximate distance between the two devices, an absolute distance between the two devices, a room number where the printing device 24 is located, GPS coordinates of the printing device 24, the IP address of the printing device, the MAC address of the printing device 24, and/or walking directions to assist a user in finding the printing device 24. Other similar navigational guides or data may also appear on such a map.

Figure 7:
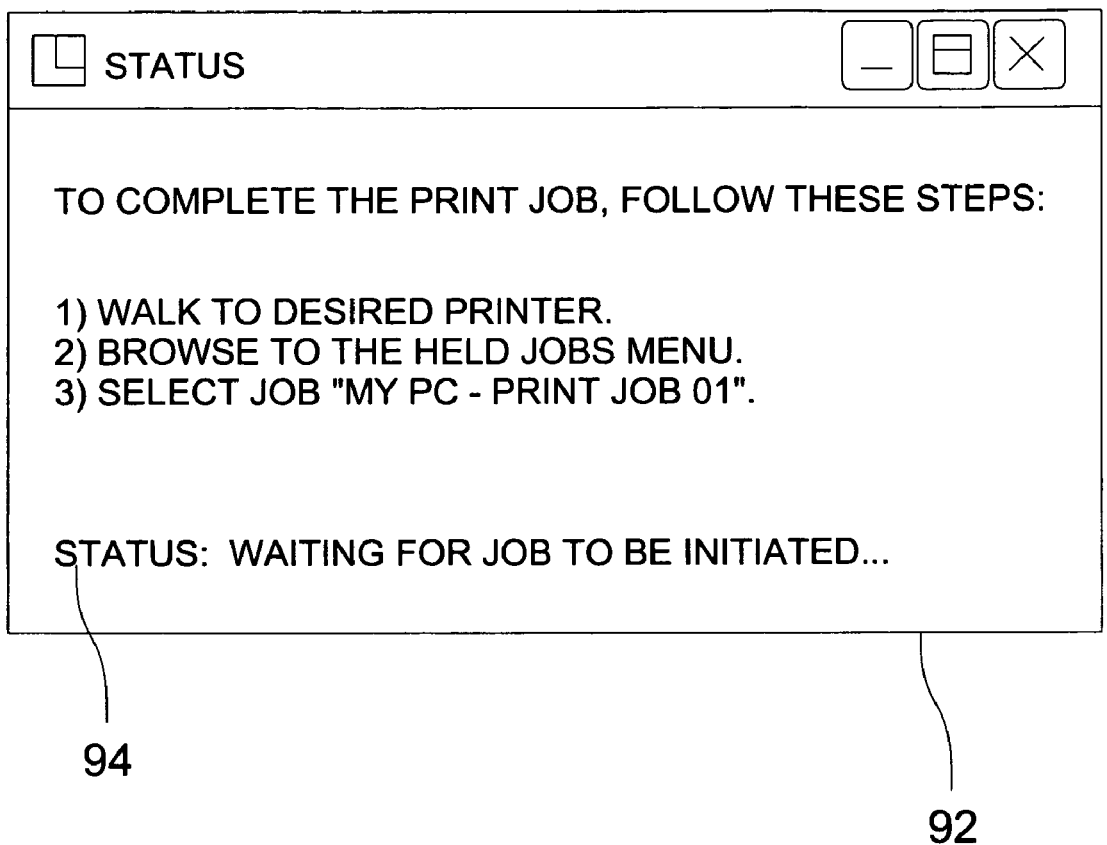
FIG. 7 is an exemplary computer screenshot from one embodiment of the present invention.

As shown in FIG. 5, a user may alternatively wish to print a print job by physically initiating the printing at the printer 24. In this case, a user would select the option titled "Hold my job on the computer 88." A user may also name 90 or rename 90 the print job to be sent to the printer 24. By selecting this option and clicking OK 80, the user will then see a screen 92 similar to FIG. 7. FIG. 7 shows an example print status screen 92 instructing the user to (1) walk to the desired printer 24, (2) browse the Held Jobs menu, and (3) select the user-named print job. FIG. 7 also shows the current status 94 of the print job. Before the user walks to the printer 24 to initiate the print job, the status 94 may read "Waiting for job to be initiated . . . " as seen in FIG. 7. After the job is initiated and while the print job is printing, other messages may be displayed to communicate the print status 94 to the user.

The present invention could be useful in many situations where users need a mobile printing solution, but have not previously installed software to communicate with a variety of nearby printers 24. An example of this would be a professor on a college campus. Many times, a professor uses a laptop to transport his work between rooms, buildings, or across campus. Should a professor need to print a document while in a location foreign to that professor, the present invention will be helpful. Similarly, traveling salesmen may find the present invention helpful. If a customer would like a price quote or a sales agreement on the spot, the salesman may use the present invention to quickly locate and print the needed documents. A businesswoman traveling to an out-of-town meeting may also use the present invention. Instead of having to install multiple printer drivers and software applications to print on foreign printers, the present invention may be conveniently and easily implemented. Many other examples may find the present invention useful.

The present invention is also a method of scanning and faxing documents. This method is similar to the method of holding a print job at the computer as described immediately above. Should a user wish to scan a document, the user could initiate the scan job by directing the user computer device to find all available scanning devices. Scanning preferences may also be determined. Based on the user computer device 20 location, all available scanning devices with the desired preferences would be displayed on the mobile printer user interface 32 in a manner similar to FIG. 5. A user may then be directed to an available scanning device to complete the scan job. Similar to FIG. 6, a map may be brought up to direct the user to the selected scanner. The device address of the user computer device is required so the scanner knows where to send the scan job.

Should a user wish to fax a document, the user could initiate the fax job by directing the user computer device to find all available faxing devices. Faxing preferences may also be determined. Based on the user computer device 20 location, all available Faxing devices with the desired preferences would be displayed on the mobile printer user interface 32 in a manner similar to FIG. 5. A user may then be directed to an available faxing device to complete the fax job. Similar to FIG. 6, a map may be brought up to direct the user to the selected faxing device.

The apparatuses, uses, and methods disclosed herein have been described without reference to specific hardware. However, the apparatuses, uses, and methods disclosed herein have been described in a manner sufficient to enable persons of ordinary skill in the art to readily adapt commercially available hardware as may be needed to reduce any of the embodiments of the present invention to practice without undue experimentation.

Following from the above description and invention summaries, it should be apparent to persons of ordinary skill in the art that, while the methods and apparatuses herein described constitute exemplary embodiments of the present invention, it is to be understood that the inventions contained herein are not limited to the above precise embodiments and that changes may be made without departing from the scope of the invention as defined by the claims. Likewise, it is to be understood that the invention is defined by the claims and it is not necessary to meet any or all of the identified advantages or objects of the invention disclosed herein in order to fall within the scope of the claims, since inherent and/or unforeseen advantages of the present invention may exist even though they may not have been explicitly discussed herein.

What is claimed is:

1. A method of printing, comprising:
providing a computer server linked via one or more data links to a plurality of printers, the computer server having access to identification information, location information and configuration information pertaining to each of the plurality of printers, the configuration information including information to ensure each of the plurality of printers is configured to correctly print a print job;
initiating the print job on a user computer device, the print job including print data;
querying the computer server by the user computer device for one or more available printers;
receiving from the computer server identification information and location information of each of the plurality of printers at the user computer device;
displaying identification information and location information in a list of the plurality of available printers on a user interface operating on the user computer device;
receiving a user selection for one of the plurality of available printers in the list;
transmitting the selection to the computer server;
receiving from the computer server configuration information for the selected printer at the user computer device;
configuring the print data with the configuration information at the user computer device;
transmitting the configured print data from the user computer device to the selected printer for printing on the selected printer.

2. The method of printing of claim 1, further comprising:
displaying a map on the user interface operating on the user computer device, the map including location information of the selected printer.

3. The method of printing of claim 1, wherein the location information includes at least one of relative distance, absolute distance, approximate distance, room number, GPS coordinates, MAC address, IP address, and walking directions.

4. The method of printing of claim 1, further comprising:
prior to displaying identification information and location information in a list of the plurality of available printers on a user interface operating on the user computer device, selecting by the user printing capabilities required to correctly print the print job.

5. The method of printing of claim 4, wherein the list displaying identification information and location information on a user interface operating on the user computer device includes only printers having user selected capabilities, the user selected capabilities including at least one of two-sided printing, multi-page printing, color printing, paper type, and print quality.

6. The method of printing of claim 1, wherein the list displaying identification information and location information on a user interface operating on the user computer device is based on distance between the user computer device and the printer.

7. A method of printing, comprising:
providing a computer server linked via one or more data links to a plurality of printers, the computer server having access to identification information, location information and configuration information pertaining to each of the plurality of printers, the configuration information including information to ensure each of the plurality of printers is configured to correctly print a print job;
initiating the print job on a user computer device, the print job including print data;
querying the computer server by the user computer device for one or more available printers;
receiving from the computer server identification information and location information of each of the plurality of printers at the user computer device;
displaying identification information and location information in a list of the plurality of available printers on a user interface operating on the user computer device;
transmitting a print job notification to the plurality of printers on the list;
initiating by a user the print job on a printer interface of one of the plurality of printers;
receiving from the computer server configuration information for the selected printer at the user computer device;
configuring the print data with the configuration information at the user computer device;
transmitting the configured print data from the user computer device to the selected printer for printing on the selected printer.

8. The method of printing of claim 7, the method further comprising:
displaying a map on the user interface operating on the user computer device, the map including location information of the plurality of available printers.

9. The method of printing of claim 8, wherein the location information includes at least one of relative distance, absolute distance, approximate distance, room number, GPS coordinates, MAC address, IP address, and walking directions.

10. A method of scanning, the method comprising:
providing a computer server linked via one or more data links to one or more scanners, the computer server having access to identification information, location information and configuration information pertaining to each of the one or more scanners, the configuration information including information to ensure each of the one or more scanners is configured to correctly communicate a scan job to a user computer device;
initiating the scan job on the user computer device;
querying the computer server by the user computer device for one or more available scanners;
receiving from the computer server identification information and location information of each of the one or more scanners at the user computer device;
displaying identification information and location information in a list of the one or more available scanners on a user interface operating on the user computer device;
receiving a user selection for at least one of the one or more available scanners on the list;
transmitting the selection to the computer server;
receiving from the computer server configuration information for the selected at least one of the one or more scanners at the user computer device;
configuring the scan job with the configuration information at the user computer device;
transmitting the scan job notification and a device address of the user computer device to the selected at least one of the one or more scanners on the list;
initiating by the user the scan job on a scanner interface of a first one of the selected at least one of the one or more scanners.

11. A method of scanning of claim 10, the method further comprising:
prior to initiating by the user the scan job on a scanner interface of one of the one or more scanners, displaying a map on the user interface operating on the user computer device, the map including location information of the available scanners.

12. The method of scanning of claim 11, wherein the location information includes at least one of relative distance, absolute distance, approximate distance, room number, GPS coordinates, MAC address, IP address, and walking directions.

13. A method of faxing, the method comprising:
- providing a computer server linked via one or more data links to a one or more fax devices, the computer server having access to identification information, location information and configuration information pertaining to each of the one or more devices, the configuration information including information to ensure each of the plurality of fax devices is configured to correctly communicate a fax job to a user computer device;
- initiating the fax job on the user computer device;
- querying the computer server by the user computer device for one or more available fax devices;
- receiving from the computer server identification information and location information of each of the one or more fax devices at the user computer device;
- displaying identification information and location information in a list of the one or more available fax devices on a user interface operating on the user computer device;
- receiving a user selection for at least one of the one or more available fax devices on the list:
- transmitting the selection to the computer server:
- receiving from the computer server configuration information for the selected at least one of the one or more fax devices at the user computer device:
- configuring the fax job with the configuration information at the user computer device;
- transmitting the fax job notification to the selected at least one of the one or more fax devices on the list;
- initiating by the user the fax job on a fax device interface of a first one of the selected at least one of the one or more fax devices.

14. A method of faxing of claim 13, the method further comprising:
- prior to initiating by the user the fax job on a fax device interface of one of the one or more fax devices, displaying a map on the user interface operating on the user computer device, the map including location information of the available fax devices.

15. The method of scanning of claim 14, wherein the location information includes at least one of relative distance, absolute distance, approximate distance, room number, GPS coordinates, MAC address, IP address, and walking directions.

* * * * *